INVENTOR
H. P. ANDERSON
BY
[signature]
ATTORNEY

INVENTOR
H. P. ANDERSON
BY
*[signature]*
ATTORNEY

United States Patent Office 3,140,407
Patented July 7, 1964

3,140,407

PULSE SHAPER EMPLOYING MEANS TO CONTROL TIME CONSTANT OF INCLUDED DIFFERENTIATOR CIRCUIT

Harold P. Anderson, Morris Plains, N.J., assignor to Bell Telephone Laboratories, Incorporated, New York, N.Y., a corporation of New York Filed Aug. 1, 1960, Ser. No. 46,758
20 Claims. (Cl. 307—88.5)

This invention relates to an electronic coupling circuit and more particularly to such a circuit that is adapted for shaping an available input pulse wave in such a way that it may be utilized to accomplish the selective interconnection of a plurality of electric circuits by electronic means.

In certain electric communication systems where it is necessary to interconnect a plurality of electric circuits, complex relay and switch arrangements have been employed for connecting one circuit to one of a plurality of other circuits. For example, in telephone systems it is often desirable that a single subscriber be able to connect his telephone set to any one of a plurality of lines serving his premises. In order to accomplish this purpose, prior art systems have generally employed the aforementioned complex relay arrangements in which the number of installation connections that must be made is disproportionately large as compared to the number of communication lines serving the telephone. In a typical relay key selection system, forty connections are required at each telephone served, regardless of the number of talking paths provided between the subscriber's premises and the central office, in order to supply all of the necessary auxiliary functions required in a key selection system. The cost of making these connections represents approximately 25 percent of the total initial installation costs; but it is a much higher percentage of the rearrangement costs when a subscriber wishes to have a different set of talking paths made connectable to a particular telephone set.

It is, therefore, one object of this invention to reduce the complexity of selective interconnecting arrangements for plural electric circuits.

Another object is to interconnect a plurality of electric circuits in a selective manner and by non-mechanical means with consequent savings in size, weight, complexity, and cost of the interconnecting equipment.

An additional object is to utilize electronic switching techniques for interconnecting electric circuits.

A more specific object is to utilize a unified circuit arrangement for controlling either the selective connection of one of a plurality of subscribers to a single transmission channel or the selective connection of a single subscriber to one of a plurality of transmission channels.

The above-recited objects of the invention, as well as other objects thereof, are realized in a circuit organization including a differentiating circuit having a variable time constant and having two output connections. In a first one of the output connections the voltage output wave corresponds to the differentiating circuit input wave in amplified form except as modified by changes in the differentiating circuit time constant. In the second output connection, the output voltage amplitude depends upon whether an odd or an even number of input pulses have been applied to such connection from a suitable control source. A part of the impedance of the second connection is also arranged to comprise a part of the differentiating circuit impedance. A gate device is arranged in circuit with this common impedance portion so that changes in the potential difference appearing across the common impedance portion alter the gate conduction condition and thus change the differentiating circuit effective impedance. The latter change results, of course, in a change in the differentiating circuit time constant. Thus, the gate may be made intermittently responsive to input pulses by appropriate operation of the second connection. The output voltage waves from the output connections may be utilized to control selective switching arrays.

In one illustrative embodiment of the invention in a telephone electronic key selector system the first output connection is a limiting amplifier. The second output connection is an electronic trigger circuit connected between the amplifier output and the differentiating circuit so that the trigger circuit is operated by successive amplifier output pulses, and the time constant of the differentiating circuit changes with changes in the operating condition of the trigger circuit. The resulting trigger circuit output is utilized to control a crosspoint diode for connecting a particular telephone line to a subscriber's telephone set.

In a second embodiment in a time division multiplex system a limiting amplifier and a trigger circuit still comprise the output connections, but now the trigger circuit is connected in a different manner. It is now connected between the differentiating circuit and an external control source to be actuated by pulses from the external source to control the differentiating circuit time constant in a predetermined manner. The resulting amplifier output pulses of varying pulse widths are utilized to control a gate circuit that connects one of a plurality of subscribers to a single communication channel.

A complete understanding of the invention, and some typical applications thereof, may be obtained from a consideration of the following detailed description together with the appended claims and the attached drawings in which:

Figure 1:
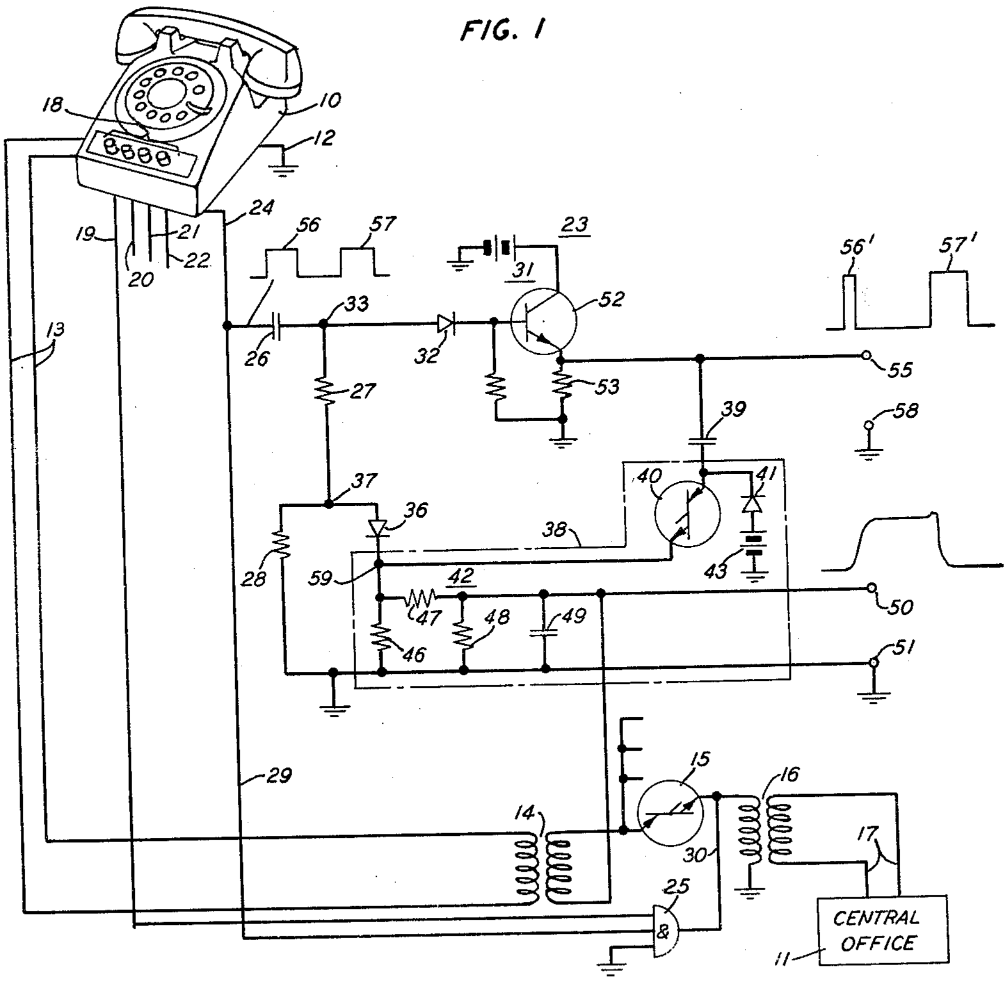
FIG. 1 is a simplified schematic diagram of the invention as applied to a telephone subscriber key selection system.

In the subscriber key selection system of FIG. 1, a subscriber's telephone set 10 may be connectable to a central office 11 by any one of a plurality of talking paths. The set 10 has a common ground connection 12 and is connected by conductors 13, 13 to the primary winding of a transformer 14. The secondary winding of transformer 14 is coupled to central office 11 by the plural talking paths, each of which includes a PNPN crosspoint diode 15, a transformer 16, and the leads 17, 17. In order to avoid unnecessary complication of the drawing, only one talking path and its associated control are shown. The remaining paths are indicated by partial connections at the secondary of transformer 14. Four buttons 18 on telephone set 10 actuate four control leads 19, 20, 21, and 22, and a control circuit 23 in accordance with the invention to couple telephone set 10 to a corresponding one of the plural talking paths.

In accordance with the invention, diode 15 is controlled by the electronic coupling circuit 23 in response to line selection pulses on a lead 24 initiated by operation of a selector button 18. Circuit 23 shapes its input pulses to wave forms that may be utilized to actuate switching devices in a required manner. In practice conductors 13, 13, transformers 14 and 16, diode 15, and circuit 23 will generally be located on the subscriber's premises along with control leads 19 through 22 and circuits coupling them to diodes 15.

Coupling circuit 23 includes a capacitor 26 and resistors 27 and 28 connected in series in the order named between input lead 24 and ground to comprise a differentiating circuit having a long time constant compared to the duration of input pulses received from set 10. A first output circuit for the differentiating circuit includes a limiting transistor amplifier 31 coupled by means of a diode 32 to the differentiating circuit at a terminal 33 which is common to capacitor 26 and resistor 27. A second output connection from the differentiating circuit includes a gate diode 36 and a trigger circuit 38 that is coupled by diode 36 to a terminal 37 that is common to resistors 27 and 28. A capacitor 39 couples the output of amplifier 31 to an input of trigger circuit 38.

Circuit 38 is a binary counter arrangement which is of the type disclosed in detail in the W. C. Jones and P. G. Ridinger, Patent 3,021,436 which issued February 13, 1962. Briefly this circuit is arranged so that the application of a first input pulse to one electrode of a PNPN diode 40 biases the diode into conduction. This first impulse is short compared to the time constant of network 42. Diode 40 continues to conduct under the influence of current supplied thereto from a battery 43 after the removal of the input pulse. Upon the application of a second input pulse of the same polarity, but of longer duration, to the same diode electrode, however, the diode 40 is biased off. The particular form of the circuit utilized in FIG. 1 is designed to be responsive as described when the input pulses are alternate short duration and long duration pulses. Also in circuit 38 the time constant of network 42 is made small compared to the duration of the mentioned second longer input pulse so that conduction in diode 40 actually ends shortly after the beginning of the second pulse rather than upon the removal of the second pulse as was the case in the embodiment illustrated by Jones and Ridinger.

Diode 40 is connected in series with a diode 41 and an impedance network 42 between the terminals of battery 43 which has one terminal thereof grounded. Network 42 includes a resistor 46 connected in series with diode 36 between terminal 37 and ground. A potential divider combination including the series-connected resistors 47 and 48 shunts resistor 46, and resistor 48 is in turn shunted by a capacitor 49. The resistances of network 42 in the embodiment illustrated were designed to have a total resistance which is much lower than the resistance of resistor 28. Consequently, when diode 36 is conducting, impedance network 42 of circuit 38 is a significant part of the shunt-connected branch of the differentiating network.

In the quiescent condition of the circuit of FIG. 1, a transistor 52 in amplifier 31 is nonconducting because its base and emitter electrodes are both at ground potential. All of the illustrated diodes are also non-conducting. Terminal 33 is at ground potential, and output terminals 50 and 51 of trigger circuit 38 are also at ground potential. Battery 43 tends to forward bias PNPN diode 40 and diode 41, but it has insufficient terminal voltage to initiate breakdown in diode 40. Capacitor 39 is charged to the terminal potential of battery 43 through a circuit which includes diode 41, an emitter load resistor 53 of amplifier 31, and ground.

To initiate operation of the circuit, the subscriber lifts the telephone handset and depresses the selector button 18 corresponding to the outgoing line 19. This action causes a first positive-going pulse 56 to be applied to input lead 24 of the line selector circuit 23 and to control lead 19 in a well-known manner. Pulse 56 is coupled through capacitor 26 to bias diodes 32 and 36 On for conduction. As previously noted, the resistance which trigger circuit 38 presents to the differentiating circuit branch including diode 36 is much smaller than the resistance of resistor 28 so the differentiating circuit has a relatively short time constant when diode 36 is On. The leading edge of pulse 56 is, therefore, differentiated to produce at terminal 33 a narrow positive-going impulse of much shorter duration than the duration of pulse 56. The differentiated impulse triggers transistor 52 into saturated conduction thereby developing a positive potential with respect to ground at the emitter electrode thereof and initiating output pulse 56′ at output terminals 55 and 58. This positive potential combines in aiding relationship with the charge potential on capacitor 39 to bias diode 41 Off for nonconduction and to bias PNPN diode 40 On.

Transistor 52 returns to its nonconducting condition almost immediately upon the termination of the differentiated triggering impulse. Diode 40 remains in conduction since battery 43 is able to supply the small sustaining current which is required by diode 40 to maintain conduction once its breakdown voltage has been exceeded. Since transistor 52 is no longer conducting, the potential at its emitter electrode returns to ground potential, and the impulse 56′ is terminated.

Usually input pulse 56 will have a relatively small magnitude, such as 5 volts, while the amplifier output at the emitter electrode of transistor 52 may have a much larger magnitude, such as 25 volts. When diode 40 is On, current flows therethrough from battery 43 and begins to charge capacitor 49 in network 42. Soon after diode 40 begins to conduct, a sufficient potential is developed at terminal 59 to bias gate diode 36 Off. Accordingly, the resistive branch of the differentiating circuit now includes only resistors 27 and 28 which, as mentioned before, cause it to have a relatively long time constant. When capacitor 49 has become fully charged, the potential with respect to ground at terminal 59 is about 25 volts, and subsequent input pulses cannot bias diode 36 On.

As previously mentioned, input pulse 56 is also applied to control lead 19. Pulse 56 is coupled by lead 19 to one input of an inverting AND gate 25. A lead 29 couples the pulse 56 from lead 24 to another input of gate 25, simultaneously with that coupled by lead 19, so that gate 25 produces a negative pulse that is applied by a lead 30 to one terminal of diode 15. The other terminal of diode 15 is at a positive voltage due to the potential difference developed across capacitor 49. The combined positive and negative voltages are sufficient to bias diode 15 On, and the positive potential across capacitor 49 is sufficient to sustain conduction in diode 15 after pulse 56 ends. The circuit remains in this condition with diode 40 On until the subscriber either depresses a different one of the selector buttons 18 corresponding to one of the other control leads 20 through 22 and thereby releases the button corresponding to line 19 or restores the telephone handset to its cradle.

Upon the release of button 18 associated with line 19, a second positive-going pulse 57 is applied to the lead 24. Diode 36 remains Off because the positive potential at terminal 59 is much higher than the peak amplitude of input pulse 57. Diode 32 is biased into conduction, and pulse 57 triggers amplifier 31 into conduction once more. The differentiating circuit now has a long time constant compared to the duration of pulse 57, and the pulse is coupled therethrough with substantially no differentiation to appear as the amplified pulse 57′ at terminals 55 and 58.

A positive potential is again developed across resistor 53 in aiding relationship with the potential difference across capacitor 39. An initially increasing surge of current is passed by diode 40 as a result of the increase in the total applied potential, and the charge on capacitor 49 likewise increases as shown in the wave form adjacent the output terminals 50 and 51. However, the potential appearing across resistor 53 tends to reduce the previous charge on capacitor 39 due to current from battery 43, but the same potential also tends to increase the charge on capacitor 49. The result of these changes is that the net potential difference applied to the diode 40 is reduced. Ultimately the current therethrough is reduced below the sustaining current level so that diode 40 is biased Off. It is, of course, clear that the time constant of the circuit including resistor 53, capacitor 39, diode 40, and network 42 must be much smaller than the time constant of capacitor 26 and resistors 27 and 28 so that capacitor 49 may become sufficiently charged during pulse 57′ to block conduction in diode 40.

The output voltage wave applied to diode 15 is also terminated as diode 40 is biased Off. Capacitor 49 now discharges through resistor 48, and diode 15 is biased Off to disconnect leads 13, 13 from central office 11. Pulse 57′ is terminated upon the termination of pulse 57 and the consequent removal of the conducting bias from transistor 52. Diode 15 and coupling circuit 23 have now been restored to their normal unoperated conditions to await further pulses from telephone set 10.

In summary with respect to FIG. 1, the co-operation of the differentiating circuit with its output coupling networks, limiting amplifier 31 and trigger circuit 38, enables a single wave of input pulses to be shaped into two output waves of different configurations. One of the latter waves controls a switching diode 15 whereby one of a plurality of subscriber lines may be selected by the subscriber from his telephone set 10.

The circuit of FIG. 1 has been simplified by eliminating therefrom circuits providing supervisory functions at telephone set 10 in order to demonstrate more clearly the operation of the coupling circuit in accordance with the invention. However, it has been found that the use of this coupling circuit makes it possible to reduce the installation connections from the forty previously mentioned for a relay system to only nine for the electronic system. This reduction in the required connections to less than 25 percent of the number previously required results in substantially reduced expenses for initial installations of key selector systems and for rearrangement of installed systems.

The first output voltage wave from the coupling network 23 appears at terminals 55 and 58 and corresponds to the input wave except insofar as the pulse widths of certain of the output pulses have been changed as a result of changes in the time constant of the differentiating circuit. The second output wave appears at terminals 50 and 51 and includes essentially two voltage levels, a high level in response to an initial input pulse and a lower level in response to a second input pulse. At each transition between levels in the latter wave, trigger circuit 38 biases diode 36 to be either responsive or nonresponsive to input pulses and thereby causes corresponding changes to take place in the time constant of the differentiating circuit.

Figure 2:
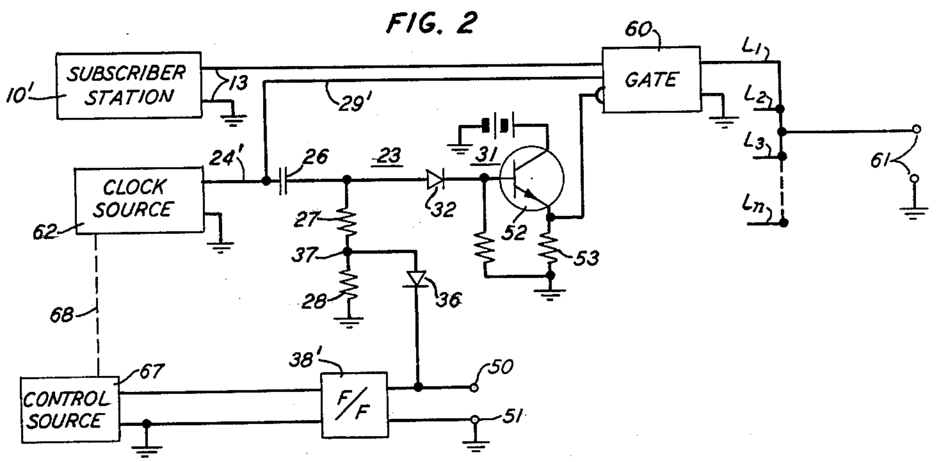
FIG. 2 is a simplified schematic diagram of the invention applied to a time division multiplex system.

In FIG. 2 the coupling circuit of the invention is illustrated in a time division multiplex system wherein the basic operation of the coupling circuit is essentially the same as in FIG. 1, but the output waves thereof are utilized in a different manner to accomplish a slightly different purpose. Circuit elements of FIG. 2 which correspond to similar elements of FIG. 1 have been designated by the same or similar reference characters.

The subscriber station 10′ may comprise one of a plurality of subscribers' telephone sets or data transmitters or other similar sources of signals in a given geographical area. This station is adapted to be connected through leads 13, 13, a gate circuit 60, and a line $L_1$ to a pair of terminals representing an outgoing transmission line 61. Other subscriber stations may be similarly connected to line 61 on a time-sharing basis through the lines $L_2$, $L_3$ . . . $L_n$. Each of the couplings between a subscriber's station and its respective lines $L_1$ through $L_n$ includes a gate circuit 60 controlled by a coupling circuit 23 of the type described in connection with FIG. 1.

Figure 3:
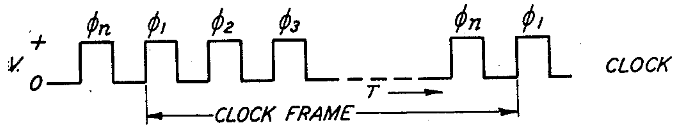
FIGS. 3 through 7 comprise a voltage wave timing diagram, not drawn to scale but having a common time axis of abscissas, illustrating the operation of the circuit of FIG. 2.

The input pulses to line 24′ are clock pulses of the type illustrated in FIG. 3 and supplied by a source 62 to all of the coupling circuits 23 for each of the $n$ subscriber stations. Each coupling circuit receives a different phase of the clock output.

In the FIG. 2 embodiment, the differentiating circuit branch which includes diode 36 is connected to a trigger circuit 38′ which may be a conventional transistor flip-flop circuit including an impedance in common with the differentiating circuit. Trigger circuit 38′ is connected to an external control source 67 instead of being actuated from the output of amplifier 31 as was the case in FIG. 1. Source 67 is coupled to clock source 62 as schematically represented by a broken line 68 to provide synchronized operation of both sources. Source 67 may provide equal time-sharing as herein described, or it may be arranged as desired to provide time-sharing with certain of the stations 10′ having unequal access to line 61.

Flip-flop circuit 38′ may, for example, be a bistable multivibrator with its input connected to the base emitter circuit of one transistor and with diode 36 and output terminal 50 being connected to the collector electrode of the other transistor. Thus, when diode 36 is conducting, a low resistance to ground is seen from terminal 37 through flip-flop 38′. When diode 36 is Off the resistance to ground from terminal 37 is a function of the resistance of resistor 28.

Figure 4:
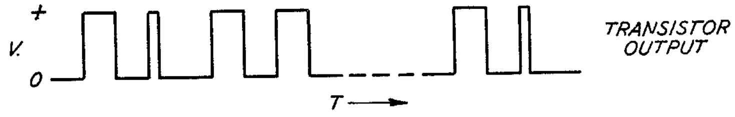
Figure 5:
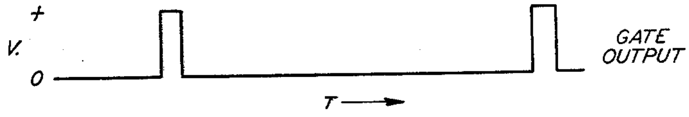

In the embodiment of FIG. 2, flip-flop circuit 38′ initially tends to bias diode 36 for conduction so that a first clock pulse $\varphi_1$ is differentiated. The differentiated leading edge impulse is coupled through amplifier 31 to inhibit gate 60 for a brief initial portion of the $\varphi_1$ interval. After the end of the differentiated $\varphi_1$ pulse shown in FIG. 4, there is no more inhibit action and the coincidence of the remainder of clock pulse $\varphi_1$ applied by lead 29′ with output from station 10′ applied over one lead 13 enables transmission through gate 60. As shown in FIG. 5, the output of gate 60 includes the transmitted part of the $\varphi_1$ clock pulse amplitude modulated by signals from station 10′.

Figure 6:
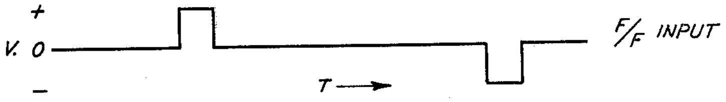
Figure 7:
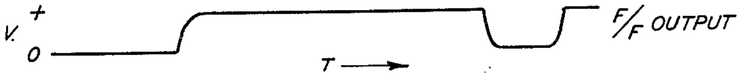

Control source 67 applies a set pulse, shown in FIG. 6, to circuit 38′ to reverse its conducting condition and bias diode 36 Off at the end of clock pulse $\varphi_1$. Subsequent output pulses from clock source 62 are not significantly differentiated and inhibit transmission from station 10′ and source 62 during each of the subsequent time slots $\varphi_2$ through $\varphi_n$ so that transmission may take place over one of the remaining lines $L_2$ through $L_n$. Upon the termination of clock pulse $\varphi_n$ source 67 supplies a reset pulse to trigger circuit 38′ thereby restoring the latter circuit to its initial condition so that the clock pulse $\varphi_1$ of the subsequent clock frame may be differentiated to premit further transmission through the gate 60. The output of circuit 38′ is available at terminals 50 and 51 as in FIG. 1 and this output is illustrated in FIG. 7. In some systems the output at terminals 50 and 51 may be utilized to perform memory functions or common control functions in the system.

In review with respect to FIGS. 1 and 2, coupling circuit 23 receives input pulses and shapes those pulses into two different wave forms which may be utilized to control switching devices in selective coupling arrays. In one case the switching device is a crosspoint diode in a telephone key selector system and in another case the device is a coincidence gate in a time division multiplex system. In both cases the combination producing two wave forms for controlling the devices utilizes a differentiating circuit having a variable time constant.

This invention has been herein described in connection with particular applications and embodiments thereof. It is to be understood, however, that additional applications of the invention and further circuit embodiments utilizing the principles of the invention which will be apparent to those skilled in the art are included within the spirit and scope of the invention.

What is claimed is:

1. A wave shaping circuit comprising a differentiator having a series-connected capacitor and a shunt-connected first resistor, a second resistor connected in series with said first resistor and said capacitor, a diode and an impedance connected in parallel with said second resistor, the resistive portion of said impedance being substantially smaller than the resistance of said second resistor, means applying pulses to said differentiating circuit, an amplifier connected to the output of said differentiating circuit, means connecting the output of said amplifier to said diode for biasing said diode Off in response to a first one of said pulses, and said connecting means being responsive to a second one of said pulses for biasing said diode On.

2. An electronic coupling circuit comprising a differentiating circuit having a series branch and a shunt branch, means applying time spaced pulses to the input of said differentiating circuit, an amplifier coupled to the output of said differentiating circuit and producing further time spaced pulses in response to the first mentioned pulses and having the same repetition rate, and means connected between the output of said amplifier and said shunt branch and responsive to different ones of said further pulses for alternately increasing and decreasing the resistance of said shunt branch.

3. A variable differentiating circuit having two shunt branches of substantially different resistances, means applying pulses to said circuit, a diode in one of said branches, impedance means connected in series with said diode in said one branch and having a resistive component which is much smaller than the resistance of the other one of said branches, and means including said impedance means alternately biasing said diode to enable and disable said diode for conduction of pulses and thereby change the time constant of said differentiating circuit.

4. The differentiating circuit in accordance with claim 3 which comprises, in addition means coupling differentiated pulses of only one polarity to the output of said differentiating circuit.

5. The differentiating circuit in accordance with claim 3 in which said bias means is a binary counting circuit, means connecting said output of said differentiating circuit to an input of said counting circuit to trigger said counter back and forth between two response conditions, the potential differences developed across said impedance means in said two conditions tending to bias said diode Off and On, respectively.

6. A wave shaping circuit comprising a source of pulses at a first frequency, a differentiating circuit connected to said source and including a series-connected capacitor and a shunt-connected resistor, a first output circuit for said differentiating circuit and comprising an amplifier having its input connected between the terminals of said resistor, a second output circuit connected across a portion of said resistor, said second output circuit being intermittently responsive to said pulses whereby its output voltage has a lower frequency than said first frequency, said second output circuit having an input resistance during its responsive intervals which is much smaller than the resistance of said portion and during its nonresponsive intervals is much larger than the resistance of said portion, said first output circuit being responsive to the output of said differentiating circuit for producing a short pulse when said second output circuit is responsive to said input pulses and for producing a longer output pulse when said second output circuit is not responsive to said input pulses.

7. The wave shaping circuit in accordance with claim 6 in which means connect said first output circuit to said second output circuit for controlling said second output circuit to be responsive to alternate ones of said input pulses.

8. The wave shaping circuit in accordance with claim 6 in which control means are connected to said second output circuit for controlling the pattern of occurrence and the duration of said nonresponsive intervals.

9. The wave shaping circuit in accordance with claim 6 in which means connect the output of said source of pulses to said second output circuit for controlling said second output circuit to be responsive to alternate input pulses.

10. The wave shaping circuit in accordance with claim 6 in which said amplifier is a transistor limiting amplifier restricting the maximum output voltage excursion of said first output circuit.

11. A wave shaping circuit comprising a differentiator having a series-connected capacitor and two parallel-connected shunt resistive branches, a first one of said branches having with said capacitor a time constant which is substantially different from the time constant of the second one of said branches with said capacitor, gate means connected in said second branch, and means applying pulses to said gate for alternately disabling and enabling said second branch in response to different ones of said pulses, respectively.

12. The wave shaping circuit in accordance with claim 11 in which said means applying pulses to said gate comprises a connection between the output of said differentiating circuit and said gate means.

13. The wave shaping circuit in accordance with claim 11 in which said means applying pulses to said gate comprises a PNPN diode binary counter having said diode connected between the output of said differentiating circuit and said second branch and having an impedance which is common to said counter and to said second branch.

14. The wave shaping circuit in accordance with claim 11 in which a source of pulses is connected to the input of said differentiator, and said means applying pulses to said gate comprises means responsive to pulses from said source.

15. The wave shaping circuit in accordance with claim 11 in which said means applying pulses to said gate comprises control means actuating said gate in accordance with a predetermined pattern.

16. The wave shaping circuit in accordance with claim 11 which comprises, in addition, an amplifier including means normally biasing said amplifier in a nonconducting condition, a first diode connecting the output of said differentiating circuit to the input of said amplifier for biasing said amplifier into conduction in response to differentiated output pulses of a single polarity, and said gate means comprising a second diode connected in series in said second branch.

17. The wave shaping circuit in accordance with claim 11 which comprises means deriving from said differentiating circuit a first output wave which includes short pulses when said gate means is enabled and long pulses when said gate means is disabled, and an output circuit connected to said gate means for deriving voltage wave portions of different average amplitudes in response to the disabled and enabled conditions of said gate means, respectively.

18. A wave shaping circuit which comprises a source of input pulses at a first frequency, a first capacitor, first and second resistors connected in series with said capacitor across the output of said pulse source, a transistor amplifier connected in the emitter follower configuration and including an emitter load resistor, means connecting the input of said amplifier across said first and second resistors and including a first diode connected in series between the base electrode of said transistor and a common terminal of said capacitor and said first resistor, a first output circuit connected across said load resistor, a binary counter comprising a source of potential, a second diode, a PNPN diode, and an impedance connected in series with said second diode and said PNPN diode across the terminals of said source in the order named, said potential source tending to forward bias both said second diode and said PNPN diode, said impedance comprising a third resistor connected between said PNPN diode and said potential source, fourth and fifth resistors connected in series across said third resistor, and a second capacitor connected in parallel with said fifth resistor, a second output circuit connected in parallel with said second capacitor, the resistive component of said impedance being much smaller than the resistance of said second resistor, and a third diode connected between an intermediate terminal of said first and second resistors and an intermediate terminal between said PNPN diode and said third resistor.

19. The wave shaping circuit in accordance with claim 18 in which the time constant of said second capacitor and said third, fourth, and fifth resistors is less than the duration of one of said input pulses.

20. A wave shaping circuit comprising means supplying control pulses, means differentiating said control pulses, a first output circuit connected to said differentiating means, a trigger circuit having an impedance in common with said differentiating means, a second output circuit connected to said trigger circuit, a diode gate connected in series with said common impedance in said differentiating means, means, including said trigger circuit, opening and closing said gate to change the time constant of said differentiating means, a signal transmission gate, means applying control pulses from said source to said transmission gate, and means connecting one of said output circuits for cooperating with said control pulses to control the output wave of said transmission gate.

References Cited in the file of this patent

UNITED STATES PATENTS

| | | |
|---|---|---|
| 2,506,429 | Melick | May 2, 1950 |
| 2,533,001 | Eberhard | Dec. 5, 1950 |
| 2,615,971 | Malthaner et al. | Oct. 28, 1952 |
| 2,702,853 | Watson | Feb. 22, 1955 |
| 2,702,855 | Bess | Feb. 22, 1955 |
| 2,730,632 | Curtis | Jan. 10, 1956 |
| 2,872,592 | Dickinson | Feb. 3, 1959 |
| 2,909,675 | Edson | Oct. 20, 1959 |
| 2,974,238 | Lohman | Mar. 7, 1961 |
| 3,021,436 | Jones et al. | Feb. 13, 1962 |